US009674177B1

(12) United States Patent
Nyström (10) Patent No.: US 9,674,177 B1
(45) Date of Patent: Jun. 6, 2017

(54) DYNAMIC KNOWLEDGE-BASED USER AUTHENTICATION WITHOUT NEED FOR PRESENTATION OF PREDETERMINED CREDENTIAL

(75) Inventor: Magnus Nyström, Vallentuna (SE)

(73) Assignee: EMC IP Holding Company LLC, Hopkinton, MA (US)

( * ) Notice: Subject to any disclaimer, the term of this patent is extended or adjusted under 35 U.S.C. 154(b) by 1406 days.

(21) Appl. No.: 12/333,385

(22) Filed: Dec. 12, 2008

(51) Int. Cl.
*G06F 17/30* (2006.01)
*H04L 29/06* (2006.01)

(52) U.S. Cl.
CPC ........ *H04L 63/083* (2013.01); *H04L 63/0846* (2013.01)

(58) Field of Classification Search
CPC ........ G06F 21/31; G06F 21/316; G06F 21/46; G06F 2221/2103; G06Q 20/40; G06Q 20/401; H04L 63/083; H04L 63/1441; H04L 9/3271
USPC .......................................................... 726/2
See application file for complete search history.

(56) References Cited

U.S. PATENT DOCUMENTS

| | | | | |
|---|---|---|---|---|
| 5,991,882 A * | 11/1999 | O'Connell | ............... | G06F 21/31 726/18 |
| 6,883,095 B2 * | 4/2005 | Sandhu | .................... | G06F 21/46 713/168 |
| 6,973,575 B2 * | 12/2005 | Arnold | ........................... | 713/186 |
| 7,231,657 B2 * | 6/2007 | Honarvar et al. | ................. | 726/2 |
| 7,761,384 B2 * | 7/2010 | Madhogarhia | .................. | 705/75 |
| 7,836,492 B2 * | 11/2010 | Srinivasan et al. | ............... | 726/6 |
| 7,861,287 B2 * | 12/2010 | Pomerantz | ........................ | 726/6 |
| 7,874,011 B2 * | 1/2011 | Boss et al. | ...................... | 726/28 |
| 2002/0147914 A1* | 10/2002 | Arnold | .......................... | 713/186 |
| 2003/0154406 A1* | 8/2003 | Honarvar | ............... | G06Q 10/10 726/10 |
| 2005/0071168 A1* | 3/2005 | Juang et al. | .................. | 704/273 |
| 2006/0288225 A1* | 12/2006 | Jung | .................. | G07C 9/00142 713/182 |
| 2007/0022300 A1* | 1/2007 | Eppert et al. | .................. | 713/183 |

(Continued)

OTHER PUBLICATIONS

F. Asgharpour et al., "Adaptive Challenge Questions Algorithm in Password Reset/Recovery," First International Workshop on Security for Spontaneous Interaction: IWSSI '07, Innsbruck, Austria, Sep. 2007, 6 pages.

*Primary Examiner* — Farid Homayounmehr
*Assistant Examiner* — Lizbeth Torres-Diaz
(74) *Attorney, Agent, or Firm* — Ryan, Mason & Lewis, LLP (57) ABSTRACT

A personal computing device, server or other type of processing device authenticates a user attempting to access a protected resource by verifying user knowledge of one or more extracted characteristics of stored information indicative of an internal operating state of that resource. The one or more extracted characteristics are characteristics that would likely be known to the user if that user had made one or more previous authenticated accesses to the protected resource. For example, the extracted characteristics may be indicative of a manner in which the user had utilized the protected resource during the one or more previous authenticated accesses to the protected resource. The processing device receives input from the user regarding the one or more extracted characteristics, and grants or denies access to the protected resource based at least in part on the input received from the user.

21 Claims, 3 Drawing Sheets

(56) References Cited

U.S. PATENT DOCUMENTS

| | | | |
|---|---|---|---|
| 2007/0094717 A1* | 4/2007 | Srinivasan et al. | 726/5 |
| 2007/0219792 A1* | 9/2007 | Normandin | 704/239 |
| 2007/0219928 A1* | 9/2007 | Madhogarhia | 705/75 |
| 2007/0271601 A1* | 11/2007 | Pomerantz | G06F 21/31 726/5 |
| 2008/0134317 A1* | 6/2008 | Boss | G06F 21/31 726/18 |
| 2008/0208580 A1* | 8/2008 | Scholl | 704/246 |
| 2009/0319806 A1* | 12/2009 | Smith et al. | 713/193 |
| 2010/0070892 A1* | 3/2010 | Metz et al. | 715/764 |

\* cited by examiner

DYNAMIC KNOWLEDGE-BASED USER AUTHENTICATION WITHOUT NEED FOR PRESENTATION OF PREDETERMINED CREDENTIAL

FIELD OF THE INVENTION

The present invention relates generally to the field of user authentication, and more particularly to authentication techniques which permit a user to authenticate to a personal computing device, server or other type of processing device.

BACKGROUND OF THE INVENTION

User authentication techniques generally require that a given user present a password or other predetermined credential(s) in order to gain access to a protected resource, such as a personal computing device. For example, in a typical two-factor authentication technique, a user is equipped with an authentication token. The authentication token may be implemented as a small, hand-held device that displays a series of passwords over time. A user equipped with such an authentication token reads the currently displayed password and enters it into a user interface of the personal computing device as part of an authentication operation. The user is also generally required to enter a personal identification number (PIN). Two-factor authentication is thus based on something the user has (e.g., the authentication token) and something the user knows (e.g., the PIN). One particular example of an authentication token is the RSA SecurID® user authentication token, commercially available from RSA, The Security Division of EMC Corporation, of Bedford, Mass., U.S.A.

A problem that can arise with conventional authentication techniques is that the user may not always have the required credentials readily available. For example, in the two-factor technique described above, a user may have lost or misplaced the authentication token, and/or may have forgotten the PIN. Other types of authentication techniques, including one-factor authentication techniques which require only the entry of a single PIN or password, are similarly impacted by this problem.

Typical approaches to controlling access to protected resources when users have lost or forgotten their credentials include sending the missing credentials or new credentials via email or other out-of-band channels, asking "life questions" or "challenge questions," or relying on user properties such as biometrics. However, each of these conventional approaches has a number of significant drawbacks.

For example, the sending of missing or new credentials via email or other out-of-band channels may require that the user had previously registered his or her contact information with a service provider and further that the user has an ability to receive messages from that service provider despite not having access to the protected resource. These required conditions are not met in many situations, such as a typical scenario in which a user has forgotten a password to a personal computing device such as a personal computer (PC) or mobile telephone. Also, the requirement for remote storage of personal information may introduce privacy concerns. Out-of-band channel arrangements in which the user needs to contact an administrator to receive an emergency access password or a replacement token are costly and time-consuming for both the user and the administrator.

The asking of "life questions" or "challenge questions" also has drawbacks. Life questions are usually based on information gathered by a service provider from public records, while challenge questions are usually based on information submitted in advance by a user. However, both types of questions assume that the user has network connectivity at the time of the access attempt, which may not be the case in many situations, such as the typical scenario noted above where the user has forgotten the password to his or her PC. Also, there may be substantial costs associated with the service provider obtaining access to public records for answers to life questions or storing user-supplied answers to challenge questions. In addition, there are privacy concerns based on service provider storage and maintenance of such information. Furthermore, the security provided by such arrangements is limited in that others may be able to determine the answers from known information about the user.

The use of biometrics is typically as a primary authentication technique rather than as a backup in case of missing credentials. Although it is unlikely that a biometric such as a fingerprint, retina or voice will not be available to its corresponding user, it is possible, as in the case of a temporary condition such as a bandaged finger, an eye infection or laryngitis. Also, biometric systems are costly and have complex setup requirements. Furthermore, such systems generally provide limited security relative to their cost.

It is therefore apparent that a need exists for improved user authentication techniques which do not require presentation of a predetermined credential such as a PIN or other type of password, and which avoid the drawbacks of the above-described conventional approaches to dealing with lost or forgotten credentials.

SUMMARY OF THE INVENTION

The present invention in one or more of the illustrative embodiments described herein provides dynamic knowledge-based user authentication techniques which do not require that a given authenticating user present any particular password, biometric or other predetermined credential. Such techniques are particularly well-suited for use in situations in which the user has lost, forgotten or otherwise does not have readily available his or her usual predetermined credential(s). The illustrative embodiments considerably reduce user inconvenience in such situations.

In one aspect of the invention, a personal computing device, server or other type of processing device authenticates a user attempting to access a protected resource by verifying user knowledge of one or more extracted characteristics of stored information indicative of an internal operating state of that resource. The one or more extracted characteristics are characteristics that would likely be known to the user if that user had made one or more previous authenticated accesses to the protected resource. For example, the extracted characteristics may be indicative of a manner in which the user had utilized the protected resource during the one or more previous authenticated accesses to the protected resource. The processing device receives input from the user regarding the one or more extracted characteristics, and grants or denies access to the protected resource based at least in part on the input received from the user.

The processing device may comprise a processor coupled to a memory, and the user authentication functionality may be implemented at least in part in the form of software that is stored in the memory and executed by the processor.

In the illustrative embodiments, the extracted characteristics may comprise, by way of example, an identifier of at least one file that the user opened or otherwise utilized during a previous authenticated access, an identifier of a contact that the user had entered in an address book of the protected resource during a previous authenticated access, an identifier of a scheduled item that the user had entered in a schedule of the protected resource during a previous authenticated access, or an identifier of at least one song, video, game or other multimedia object that was played on the protected resource at user request during a previous authenticated access. Numerous other types of characteristics based on previous usage of other information elements of the protected resource may be used, as well combinations of such characteristics.

The user input regarding the extracted characteristics may be in the form of answers to questions that are generated and posed by the processing device based on the extracted characteristics. For example, exemplary questions that may be based on the extracted characteristics noted above may include:

Which of the following files have you recently been working with?

Which of the following contacts is in your address book?

Which of the following meetings were recently scheduled?

Which of the following songs have you recently listened to?

Which of the following videos have you recently watched?

Which of the following games have you recently played?

Each such question may be formulated to hide an extracted characteristic indicative of the internal state of the protected resource in a listing of other similar characteristics that may be randomly generated or otherwise do not reflect actual usage of the resource during previous authenticated accesses. Other questions may be based on a negation approach, requiring the user to identify a file that was not used recently, a contact that is not in the address book, a meeting that was not scheduled yesterday, a song that was not listened to recently, a video that was not watched recently, or a game that was not played recently. Of course, a wide variety of alternative formulations may be used, in any combination. If the user is able to answer a sufficient number of such questions, access is granted to the protected resource. Additionally or alternatively, the user may be permitted to obtain or reset the lost or forgotten credential.

The illustrative embodiments advantageously overcome the above-noted drawbacks of conventional approaches to controlling access to protected resources in the case of lost or forgotten credentials. For example, the illustrative embodiments relieve both users and administrators from the burdens associated with resetting credentials or obtaining emergency credentials. Also, certain of the illustrative embodiments, such as those implemented entirely in a PC, mobile telephone or other personal computing device, do not require network connectivity at the time of an access attempt. Moreover, the illustrative embodiments address security and privacy concerns, and avoid the cost and complexity associated with use of biometric authentication.

These and other features and advantages of the present invention will become more readily apparent from the accompanying drawings and the following detailed description.

DETAILED DESCRIPTION

The present invention will be described herein with reference to exemplary authentication systems and associated personal computing devices and other processing devices. It is to be appreciated, however, that the invention is not restricted to use with the particular illustrative system and device configurations shown.

The term "predetermined credential" as used herein is intended to include a PIN or other type of password, an authentication token, a biometric, or any other information or item that is established for use by a given user as a requirement for subsequent authentication of that user. As noted above, such predetermined credentials may not be readily available to the given user when the user desires to gain access to a protected resource. The illustrative embodiments described herein allow a user to authenticate to a system without requiring the user to present the predetermined credential(s) that would otherwise be required for the user to obtain access to that system.

Figure 1:
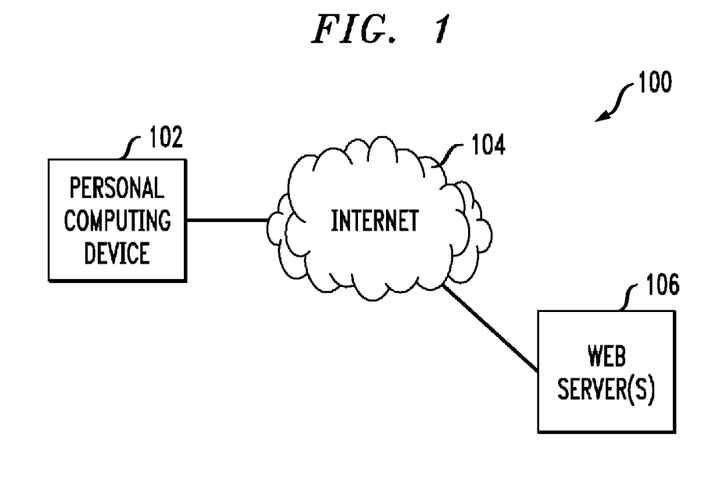
FIG. 1 is a block diagram showing one example of a dynamic knowledge-based user authentication system in an illustrative embodiment of the invention.

FIG. 1 shows an example of a dynamic knowledge-based user authentication system 100 which includes a personal computing device 102, a network 104, and one or more web servers 106. The personal computing device 102 may be, for example, a desktop, laptop or palmtop PC, a mobile telephone, a personal digital assistant (PDA), a wireless email device, a workstation, a kiosk, a television set-top box, a game console, or any other information processing device configured to support dynamic knowledge-based user authentication as described herein. A given server 106 may be implemented as a computer or other stand-alone processing platform, or may be distributed over multiple processing platforms comprising multiple separate computers. Numerous other arrangements of one or more servers are possible in the user authentication system 100. The personal computing device 102 and the server(s) 106 are examples of what are more generally referred to herein as "processing devices."

The personal computing device 102 will generally include a user interface through which an associated user can interact with the system. This interaction allows the user to authenticate to the system so as to obtain access to a protected resource without requiring the user to present a predetermined credential such as an established PIN or a password from a particular authentication token.

The protected resource may be designated functionality of the personal computing device itself. In such an arrangement, the user is able to access the interface in order to attempt to authenticate but is not granted access to any other functionality of the personal computing device until such time as the user is authenticated. An important advantage of an arrangement of this type is that the personal computing device need not have network connectivity at the time of the access request.

Alternatively, the protected resource may be a resource of the server(s) 106 or a resource accessible via the server(s) 106. In such an arrangement, the user interface of the personal computing device 102 may still be used to obtain user input as part of a process in which the user authenticates to the server(s).

The network 104, although illustratively shown as the Internet, may comprise, for example, a wide area network (WAN), a local area network (LAN), a satellite network, a telephone or cable network, or various portions or combinations of these and other types of networks.

The dynamic knowledge-based user authentication may be utilized to provide backup or emergency authentication in the event a user does not have his or her appropriate predetermined credential(s) readily available. Thus, any of a wide variety of conventional primary authentication processes may also be implemented using the system 100. These primary authentication processes may be utilized when the user is in possession of his or her appropriate predetermined credential(s). Such primary authentication processes are well known to those skilled in the art. Alternatively, the dynamic knowledge-based user authentication may itself serve as a primary authentication process in the system, or as an adjunct authentication process intended to enhance the security of one or more existing authentication processes.

It is to be appreciated that a given embodiment of the system 100 may include multiple instances of personal computing device 102, network 104 and server set 106, although only single instances of such components are shown in the simplified system diagram for clarity of illustration. For example, a given user may have multiple personal computing devices that access different sets of servers over different networks.

Figure 2:
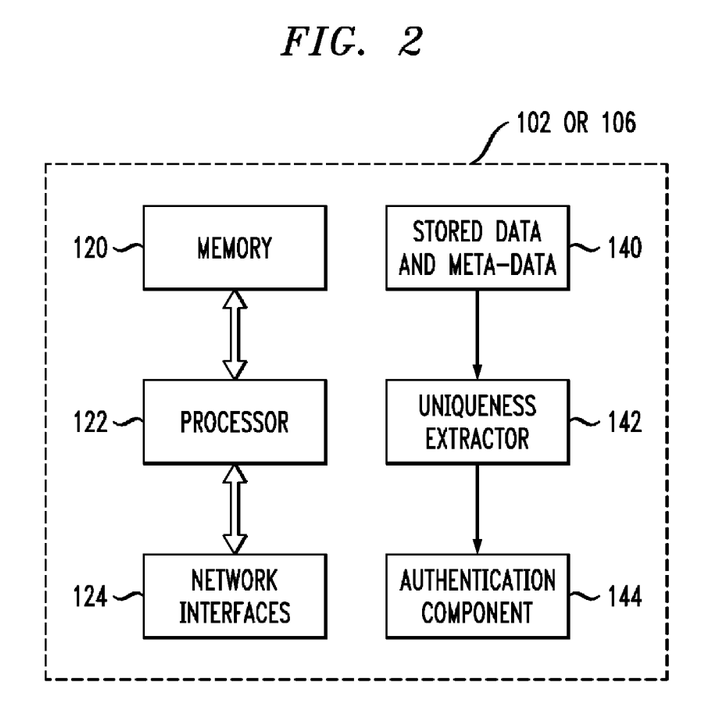
FIG. 2 shows a more detailed view of one possible implementation of a personal computing device or server of the FIG. 1 system.

Referring now to FIG. 2, a more detailed illustrative implementation of a processing device of the system 100 is shown. The processing device shown may be viewed as representing personal computing device 102 or a given server 106. The processing device 102 or 106 comprises a memory 120 coupled to a processor 122. The processor 122 is also coupled to interface circuitry comprising network interfaces 124. A given such network interface is utilized for communicating in a conventional manner with the network 104.

The various elements 120, 122 and 124 of FIG. 2 may be implemented in whole or in part as a conventional microprocessor, microcontroller, digital signal processor, application-specific integrated circuit (ASIC) or other type of circuitry, as well as portions or combinations of such circuitry elements. As will be appreciated by those skilled in the art, portions of a dynamic knowledge-based user authentication process in accordance with an embodiment of the invention can be implemented at least in part in the form of one or more software programs that are stored at least in part in memory 120 and executed by processor 122.

Also included in processing device 102 or 106 as shown in FIG. 2 are a number of additional elements, including stored information 140, a uniqueness extractor 142 and an authentication component 144. One or more of these elements may be implemented at least in part in the form of software that is stored in the memory 120 and executed by the processor 122. One skilled in the art would be readily able to implement such software given the teachings provided herein. The memory 120 is an example of what is more generally referred to herein as a "processor-readable storage medium."

The processing device 102 or 106 is configured to support dynamic knowledge-based user authentication utilizing elements 140, 142 and 144, as will be described in greater detail below with reference to FIGS. 3 and 4.

Generally, the uniqueness extractor 142 processes the stored information 140 to extract one or more characteristics that would likely be known to the user if that user had made one or more previous authenticated accesses to the protected resource. The stored information 140 may comprise, for example, stored data and meta-data indicative of a manner in which the user had utilized the protected resource during the one or more previous authenticated accesses to the protected resource. The meta-data may be used to determine previous access times for files and other information elements of the protected resource. It is important to note that the stored information 140 will typically comprise information that is already present in the processing device, such as stored files and associated meta-data. Such information is stored in the ordinary course of operation of the processing device, and may be used as a basis for user authentication as described herein.

In a given embodiment, the stored information 140 is entirely within the personal computing device 102. As mentioned above, this is a particularly advantageous arrangement in that the personal computing device need not have network connectivity at the time of the access attempt.

The characteristics extracted from the stored information 140 may more particularly include, again by way of example, an identifier of at least one file that the user opened or otherwise utilized during a previous authenticated access, an identifier of a contact that the user had entered in an address book of the protected resource during a previous authenticated access, an identifier of a scheduled item that the user had entered in a schedule of the protected resource during a previous authenticated access, or an identifier of at least one song, video, game or other multimedia object that was played on the protected resource at user request during a previous authenticated access. Alternative or additional characteristics may include, for example, an identifier of at least one web page to which a browser implemented in the protected resource was directed at user request during a previous authenticated access. As noted above, these characteristics may be extracted entirely from stored information on the personal computing device 102, without any interaction with network 104 or server(s) 106.

Numerous other types of characteristics based on previous usage of other information elements of the protected resource may be used, as well combinations of such characteristics. For example, in the case of a game played on the protected resource, the extracted characteristic may be the most recent state of the game as played during the last authenticated access, such as a particular level achieved within the game. Other examples of extracted characteristics may include various attributes of email correspondence carried out using the protected resource, such as from, to or subject information of one or more sent or received email messages. As with other types of extracted characteristics, care should be taken to prevent leakage of confidential information.

The characteristics extracted from the stored information 140 characterize the personal dynamic operating environment of the protected resource as previously utilized by the user now attempting to again access the resource. These characteristics of the previous dynamic operating environment are likely to be known only to a legitimate user. The previous authenticated access or accesses may have been made using the predetermined credential that is now unavailable to the user.

The authentication component 144 receives input from the user regarding the one or more characteristics of the stored information 140 that are extracted by the uniqueness extractor 142. For example, the authentication component may formulate a number of questions based on the extracted characteristic(s). The authentication component grants or denies access to the protected resource based at least in part on the input received from the user. This authentication process therefore leverages user knowledge of previous operating conditions of the protected resource based on his or her previous authenticated use of that resource.

Although shown as distinct elements in the FIG. 2 diagram, the uniqueness extractor 142 and the authentication component 144 may be part of a single process running on the processing device 102 or 106.

Figure 3:
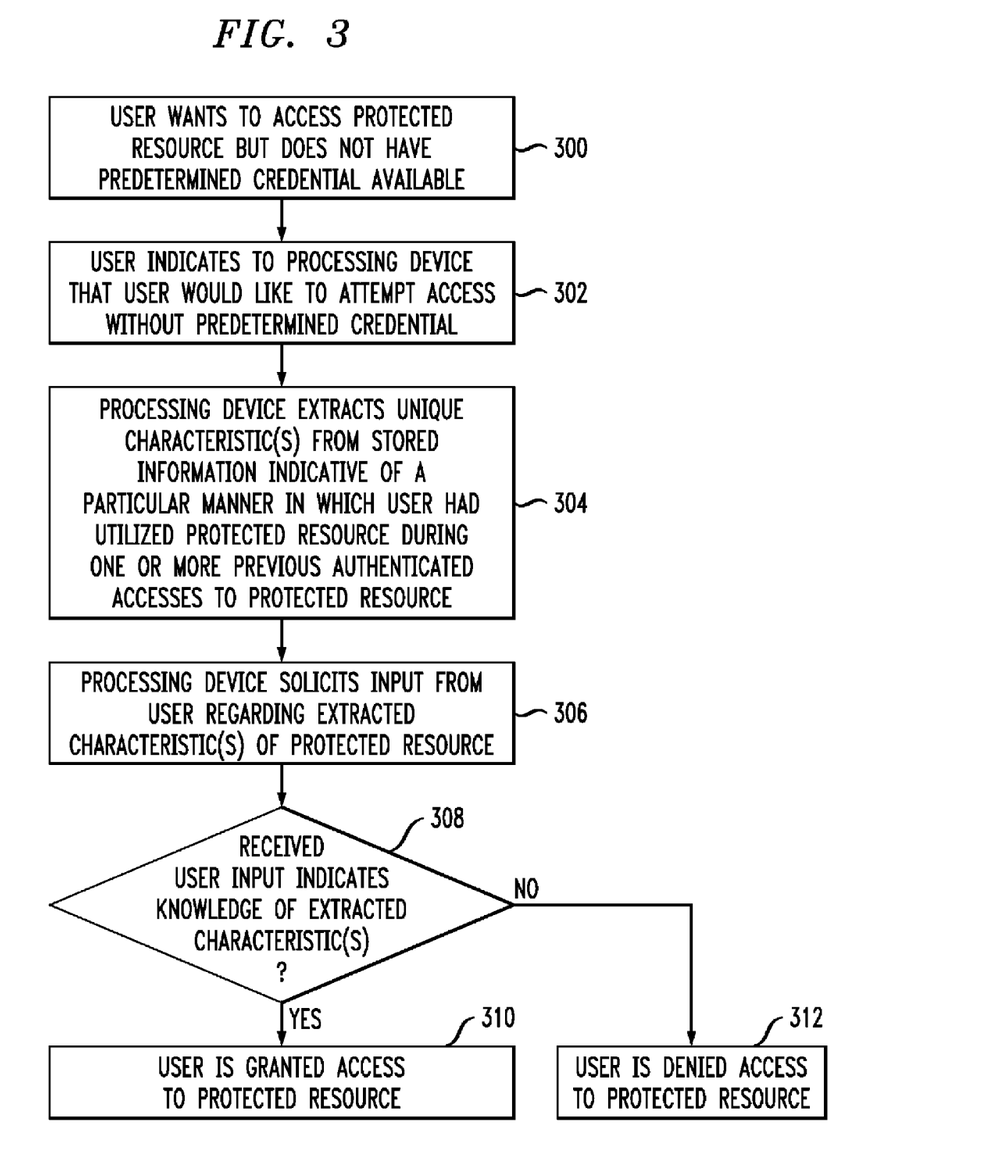
FIG. 3 is a flow diagram showing a dynamic knowledge-based user authentication process in an illustrative embodiment of the invention.

FIG. 3 shows an exemplary dynamic knowledge-based user authentication process in greater detail. The process includes steps 300 through 312, which are implemented in a processing device such as personal computing device 102 or a given server 106, using elements 140, 142 and 144 as previously described. In a given such implementation involving a server 106, the user interface of the personal computing device may be utilized to deliver requests for user input from the server and to obtain user input for delivery to the server responsive to those requests. It is to be appreciated, however, that the described process can be implemented entirely within the personal computing device 102, in a manner that does not require any network connectivity at the time of the access attempt.

In step 300, the user wants to access a protected resource but does not have the normally required predetermined credential available. For example, the user may have forgotten a PIN or password, or may have lost or misplaced an authentication token.

In step 302, the user indicates to the processing device that he or she would like to attempt to access the protected resource without using the predetermined credential.

In step 304, the uniqueness extractor 142 of the processing device extracts one or more unique characteristics from the stored information 140. The extracted characteristic(s) are indicative of a particular manner in which the user had utilized the protected resource during one or more previous authenticated accesses to the protected resource. The one or more extracted characteristics are selected such that they would likely be readily known to the legitimate user but would be difficult for an attacker to guess or otherwise determine.

In step 306, the authentication component 144 of the processing device solicits input from the user regarding the one or more extracted characteristics of the protected resource. For example, the authentication component may formulate multiple questions designed to test knowledge of the extracted characteristic(s). The questions formulated based on the one or more extracted characteristics may include, for example, questions based on a specified file of the protected resource, a specified contact from an address book of the protected resource, a specified scheduled item from a schedule of the protected resource, or a specified song, video, game or other multimedia object recently played on the protected resource. A given such question may, for example, require the user to pick the specified file, contact, scheduled item, song, video or game from respective lists of such elements each of which includes multiple elements that were not utilized in previous authenticated accesses of the protected resource. One or more other questions may be formulated using a negation approach, requiring the user to pick a specified file, contact, scheduled item, song, video or game that was not utilized in previous authenticated accesses of the protected resource from respective lists of such elements each of which includes multiple elements that were utilized in previous authenticated accesses of the protected resource. The questions may be presented to the user via the user interface of the personal computing device 102. User input in the form of answers to the questions is also received via the user interface.

In step 308, a determination is made by the authentication component 144 as to whether or not the received user input indicates sufficient knowledge of the extracted characteristics.

If the determination in step 308 is affirmative, the user is granted access to the protected resource in step 310.

Otherwise, the user is denied access to the protected resource in step 312.

As indicated above, the process steps of FIG. 3 may be implemented in the personal computing device 102 or a given server 106. Such steps may be performed under control of the processor 122 utilizing instructions and other information stored in the memory 120.

Figure 4:
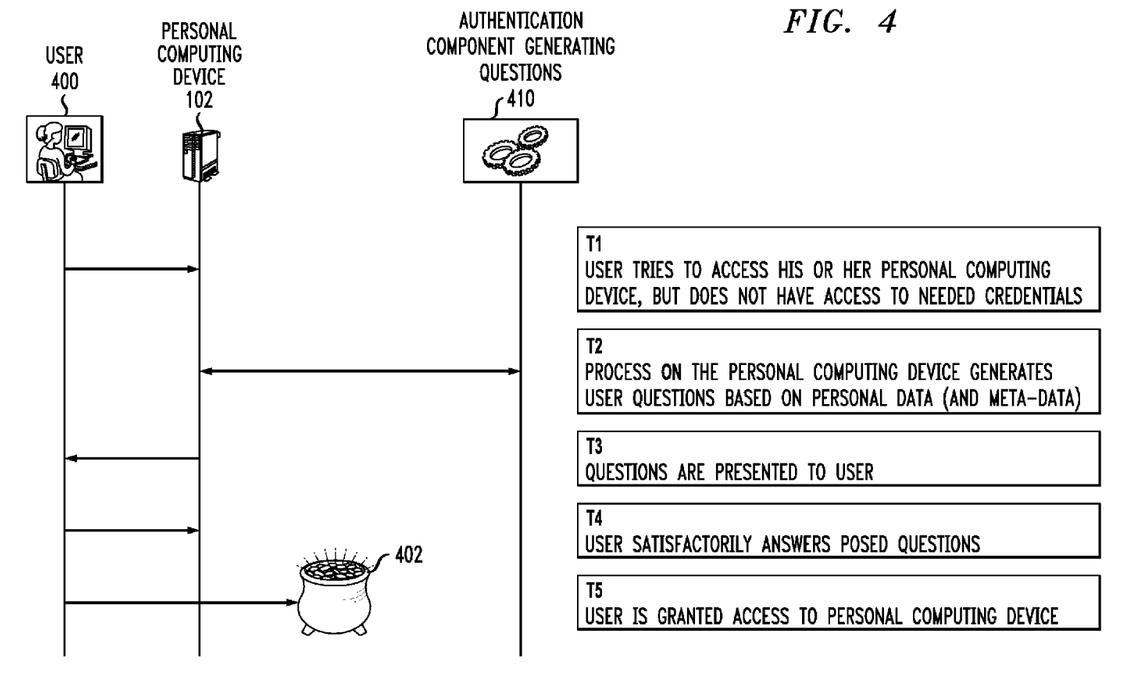
FIG. 4 shows interactions between a user and a personal computing device having an authentication component in an illustrative embodiment of the invention.

FIG. 4 illustrates the operation of an embodiment of the invention in which the process steps of FIG. 3 are assumed to be implemented entirely in the personal computing device 102.

The FIG. 4 diagram shows the interactions between a user 400 and personal computing device 102 which controls access to a protected resource 402. The personal computing device is assumed to include an authentication component 410 which may be viewed as corresponding generally to the authentication component 144 of FIG. 2. A uniqueness extractor is also assumed to be present but is omitted from the diagram for simplicity and clarity of illustration. The authentication component 410 is a process running on the personal computing device 102 utilizing processor 122 and memory 120. The interactions shown in FIG. 4 correspond to respective steps denoted T1 through T5.

In step T1, the user 400 tries to access his or her personal computing device 102, but does not have access to the needed predetermined credentials. The user may provide an explicit indication of this condition to the personal computing device, or alternatively the device may infer the condition and automatically present the user with an option of attempting access by demonstrating his or her knowledge of the internal state of the protected resource as obtained through previous authenticated accesses.

In step T2, a process on the personal computing device 102 generates user questions based on internal stored data and meta-data personal to the user of the device. This process involves extracting unique characteristics from the stored data and meta-data and formulating the questions based on the extracted characteristics in the manner previously described.

By way of example, the generated questions may include one or more of the following:

Which of the following files have you recently been working with?

Which of the following contacts is in your address book?

Which of the following meetings were recently scheduled?

Which of the following songs have you recently listened to?

Which of the following videos have you recently watched?

Which of the following games have you recently played?

Each such question essentially hides an extracted characteristic indicative of the internal state of the protected resource in a listing of other similar characteristics that may be randomly generated or otherwise do not reflect actual usage of the resource during previous authenticated accesses by the user now attempting to access. Numerous alternative question formulations are possible. For example, as mentioned previously, the questions may be formulated using a negation approach, requiring the user to pick a specified file, contact, scheduled item, song, video or game that was not utilized from respective lists of such elements each of which includes multiple elements that were utilized. The above-noted questions reformulated using the negation approach may be given by:

Which of the following files have you not recently been working with?

Which of the following contacts is not in your address book?

Which of the following meetings were not recently scheduled?

Which of the following songs have you not recently listened to?

Which of the following videos have you not recently watched?

Which of the following games have you not recently played?

Again, a wide variety of alternative question formulations may be used, in any desired combination. In the present embodiment, these questions are generated from characteristics that are extracted entirely from information stored within the personal computing device 102, and thus without any need for the personal computing device to have connectivity with the network 104 during the access attempt.

In step T3, the generated questions are presented to the user.

In step T4, the user satisfactorily answers the posed questions.

In step T5, the user is granted access to the personal computing device. Additionally or alternatively, the user may also be permitted to obtain or reset the lost or forgotten predetermined credentials, if appropriate in a particular application. For example, after a successful dynamic knowledge-based user authentication, the user may reset his or her password or other credential, and then do an ordinary logon using the reset credential.

It is to be appreciated that the particular process steps shown in FIGS. 3 and 4 as described above are exemplary only, and other embodiments may utilize different steps to implement a dynamic knowledge-based user authentication system in accordance with the invention.

As another example, consider an arrangement in which the protected resource is a web site that the user has previously accessed but the user has forgotten his or her password to access the web site. In such an arrangement, the web site, as implemented on one or more servers 106, may store information that indicates the manner in which the user had utilized the site on one or more previous authenticated accesses to that site. A process running on the web site generates questions based on unique characteristics of this stored information and presents the generated questions to the user. The user obtains access if he or she is able to demonstrate sufficient knowledge of these unique characteristics. An arrangement of this type is particularly useful for web sites that the user utilizes relatively infrequently such that the user has a greater likelihood of forgetting the password. For example, users may have intimate knowledge of previous operations associated with their accounts on web sites of their 401(k) plans and yet may visit those sites very infrequently. Also, users are unlikely to have shared such knowledge with others. Accordingly, questions may be generated in the manner described herein in order to allow those users that have forgotten their credentials to have an opportunity to access the corresponding protected resources.

As noted elsewhere herein, similar techniques can also be used as a complement to one or more existing authentication processes so as to strengthen their security.

In the illustrative embodiments described herein, the security of the authentication system may be set to a desired level based on parameters such as the number and type of questions asked, the number of alternatives from which the user must select an answer for each question, the number of questions the user needs to correctly answer to obtain access, and the entropy of each of the questions. A given implementation may therefore be designed to provide a particular security level. It is clear, however, that arbitrary security levels may in general be achieved by appropriate application of parameters similar to those described above, subject to the uniqueness of the protected resource that the user is attempting to access.

A suitable throttling mechanism may be applied to any access attempts made without predetermined credentials, in order to minimize the likelihood that attackers will be able to infer confidential user information from questions presented over multiple access attempts. For example, if a given user is unable to meet the threshold number of satisfactory answers within a first access attempt, that user may be required to wait a predetermined time before being permitted to initiate a second access attempt. The predetermined time may increase with each unsuccessful access attempt.

The illustrative embodiments described herein provide significant improvements relative to conventional approaches to dealing with situations in which the user has lost, forgotten or otherwise does not have readily available his or her usual predetermined credential(s). The illustrative embodiments considerably reduce user inconvenience in such situations by allowing the user to authenticate through demonstration of his or her knowledge of stored information indicative of the internal operating state of the protected resource. This relieves both users and administrators from the burdens associated with resetting credentials or obtaining emergency credentials. Also, certain of the illustrative embodiments, such as those implemented entirely in personal computing device 102, do not require network connectivity at the time of an access attempt. Moreover, the illustrative embodiments address security and privacy concerns, and avoid the cost and complexity associated with use of biometric authentication.

Dynamic knowledge-based user authentication in accordance with the present invention may be utilized as a backup or emergency authentication process, a primary authentication process, or as an adjunct authentication process intended to enhance the security of one or more existing authentication processes.

It should again be emphasized that the above-described embodiments of the invention are presented for purposes of illustration only. Many variations and other alternative embodiments may be used. For example, although described in the context of particular system and device configurations, the techniques are applicable to a wide variety of other types of authentication systems and associated devices. The particular process steps used to extract one or more characteristics from stored information and process user input regarding the extracted characteristic(s) may be varied in alternative embodiments. In addition, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for authenticating a user attempting to access a protected resource via a processing device without requiring the user to present a predetermined credential, the method comprising the steps of: receiving, from the user, a request to access the protected resource without providing a predetermined credential associated with the user, wherein the protected resource is an internal resource of the processing device accessible via user authentication;

extracting one or more characteristics from information stored within the protected resource, wherein the extracted one or more characteristics comprise data associated with activity performed by the user during a previous authenticated access made using the predetermined credential;

processing the extracted one or more characteristics to formulate one or more questions for the user;

presenting the one or more questions to the user;

receiving input from the user responsive to the presenting of the one or more questions;

granting or denying access to the protected resource without using the predetermined credential based at least in part on the input received from the user; and     responsive to denying access to the protected resource without using the predetermined credential, applying a throttling mechanism requiring the user to wait a predetermined time before being permitted to make a new request to access the protected resource without using the predetermined credential to reduce a likelihood of inferring the extracted one or more characteristics from the one or more questions presented over multiple requests to access the protected resource without using the predetermined credential;

wherein the predetermined time is increased after each unsuccessful attempt to access the protected resource without using the predetermined credential; and     wherein the information stored within the protected resource comprises information stored entirely in a memory of the processing device in an ordinary course of operation of the protected resource during the previous authenticated access.

2. The method of claim 1 wherein the processing device comprises a personal computing device and the steps of the method are implemented under control of a processor of the personal computing device without requiring the personal computing device to have network connectivity while the steps are carried out.

3. The method of claim 1 wherein the processing device comprises a server accessible to a personal computing device over a network and the steps of the method are implemented under control of a processor of the server.

4. The method of claim 1 wherein the extracted one or more characteristics comprise data associated with a contact that had been entered in an address book of the protected resource during the previous authenticated access made using the predetermined credential.

5. The method of claim 1 wherein the extracted one or more characteristics comprise data associated with a scheduled item that had been entered in a schedule of the protected resource during the previous authenticated access made using the predetermined credential.

6. The method of claim 1 wherein the extracted one or more characteristics comprise data associated with name or subject information that had been entered in an email message of the protected resource during the previous authenticated access made using the predetermined credential.

7. The method of claim 1 wherein the extracted one or more characteristics comprise data associated with information that had been entered in a file of the protected resource during the previous authenticated access made using the predetermined credential.

8. The method of claim 1 wherein the extracted one or more characteristics comprise data associated with information that had been entered in a game of the protected resource during the previous authenticated access made using the predetermined credential.

9. The method of claim 1 wherein the extracted one or more characteristics are extracted from meta-data of a personal dynamic operating environment of the protected resource wherein the meta-data was stored during the previous authenticated access made using the predetermined credential.

10. The method of claim 1 wherein the one or more questions comprise at least one of the following:

a first question based on a specified contact entered into an address book of the protected resource during the previous authenticated access; and     a second question based on a scheduled item entered into a schedule of the protected resource during the previous authenticated access.

11. A non-transitory processor-readable storage medium having encoded therein one or more software programs, wherein the one or more software programs when executed by at least one processor cause said at least one processor:

to receive, from a user, a request to access a protected resource without providing a predetermined credential associated with the user, wherein the protected resource is an internal resource of a processing device accessible via user authentication;

to extract one or more characteristics from information stored within the protected resource, wherein the extracted one or more characteristics comprise data associated with activity performed by the user during a previous authenticated access made using the predetermined credential;

to process the extracted one or more characteristics to formulate one or more questions for the user;

to present the one or more questions to the user;

to receive input from the user responsive to the presenting of the one or more questions;

to grant or deny access to the protected resource without using the predetermined credential based at least in part on the input received from the user; and     responsive to denying access to the protected resource without using the predetermined credential, to apply a throttling mechanism requiring the user to wait a predetermined time before being permitted to make a new request to access the protected resource without using the predetermined credential to reduce a likelihood of inferring the extracted one or more characteristics from the one or more questions presented over multiple requests to access the protected resource without using the predetermined credential;

wherein the predetermined time is increased after each unsuccessful attempt to access the protected resource without using the predetermined credential; and     wherein the information stored within the protected resource comprises information stored entirely in a memory of the processing device in an ordinary course of operation of the protected resource during the previous authenticated access.

12. The processor-readable storage medium of claim 11 wherein the extracted one or more characteristics comprise at least one of:
    data associated with a contact that had been entered in an address book of the protected resource during the previous authenticated access made using the predetermined credential; and
    data associated with a scheduled item that had been entered in a schedule of the protected resource during the previous authenticated access made using the predetermined credential.

13. The processor-readable storage medium of claim 11 wherein the one or more questions comprise at least one of the following:
    a first question based on a specified contact entered into an address book of the protected resource during the previous authenticated access; and
    a second question based on a scheduled item entered into a schedule of the protected resource during the previous authenticated access.

14. An apparatus comprising:
    at least one processing device for authenticating a user attempting to access a protected resource without requiring the user to present a predetermined credential, each such processing device comprising a processor and a memory coupled to the processor;
    wherein said at least one processing device is configured:
    to receive, from a user, a request to access the protected resource without providing a predetermined credential associated with the user, wherein the protected resource is an internal resource of said at least one processing device accessible via user authentication;
    to extract one or more characteristics from information stored within the protected resource, wherein the extracted one or more characteristics comprise data associated with activity performed by the user during a previous authenticated access made using the predetermined credential;
    to process the extracted one or more characteristics to formulate one or more questions for the user;
    to present the one or more questions to the user;
    to receive input from the user responsive to the presenting of the one or more questions;
    to grant or deny access to the protected resource without using the predetermined credential based at least in part on the input received from the user; and
    responsive to denying access to the protected resource without using the predetermined credential, to apply a throttling mechanism requiring the user to wait a predetermined time before being permitted to make a new request to access the protected resource without using the predetermined credential to reduce a likelihood of inferring the extracted one or more characteristics from the one or more questions presented over multiple requests to access the protected resource without using the predetermined credential;
    wherein the predetermined time is increased after each unsuccessful attempt to access the protected resource without using the predetermined credential; and
    wherein the information stored within the protected resource comprises information stored entirely in the memory of said at least one processing device in an ordinary course of operation of the protected resource during the previous authenticated access.

15. The apparatus of claim 14 wherein said at least one processing device comprises a personal computing device.

16. The apparatus of claim 14 wherein said at least one processing device comprises a server accessible to a personal computing device over a network.

17. The apparatus of claim 14 wherein said at least one processing device comprises:
    an extractor component configured to extract the one or more characteristics from stored meta-data of the protected resource that had been entered in a personal dynamic operating environment of the protected resource during the previous authenticated access made using the predetermined credential; and
    an authentication component coupled to the extractor component and configured to receive the input from the user responsive to the presenting of the one or more questions and to grant or deny access to the protected resource without using the predetermined credential based at least in part on the input received from the user.

18. The apparatus of claim 17 wherein the extractor component and the authentication component are implemented in a personal computing device and further wherein the personal computing device is not required to have network connectivity in order to determine if access to the protected resource should be granted or denied.

19. The apparatus of claim 14 wherein the extracted one or more characteristics comprise data associated with a contact that had been entered in an address book of the protected resource during the previous authenticated access made using the predetermined credential.

20. The apparatus of claim 14 wherein the extracted one or more characteristics comprise data associated with a scheduled item that had been entered in a schedule of the protected resource during the previous authenticated access made using the predetermined credential.

21. The apparatus of claim 14 wherein the extracted one or more characteristics comprise data associated with information that had been entered in a game of the protected resource during the previous authenticated access made using the predetermined credential.

* * * * *